US010272742B2

(12) United States Patent
Chavez Hernandez et al.

(10) Patent No.: US 10,272,742 B2
(45) Date of Patent: Apr. 30, 2019

(54) HVAC SYSTEMS AND METHODS FOR CONTROLLING ZONED INTERIOR TEMPERATURES OF A VEHICLE INCLUDING DISPLAY OF THERMOGRAPHIC ANTHROPOMORPHIC FIGURES

(71) Applicant: GM Global Technology Operations LLC, Detroit, MI (US)

(72) Inventors: Hector Chavez Hernandez, San Mateo Atenco (MX); Jorge Alejandro Estevez Garcia, Metepec (MX); David Yanez Velazquez, Toluca (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 15/416,585

(22) Filed: Jan. 26, 2017

(65) Prior Publication Data
US 2018/0208017 A1 Jul. 26, 2018

(51) Int. Cl.
*B60H 1/00* (2006.01)
*B60R 16/037* (2006.01)
*B60K 37/02* (2006.01)

(52) U.S. Cl.
CPC ..... *B60H 1/00985* (2013.01); *B60H 1/00742* (2013.01); *B60H 1/00871* (2013.01); *B60K 37/02* (2013.01); *B60H 1/00964* (2013.01); *B60R 16/037* (2013.01)

(58) Field of Classification Search
CPC ........... B60H 1/00985; B60H 1/00285; B60H 1/00292; B60H 1/00742; B60H 1/00871; B60H 1/00964; B60R 16/037
See application file for complete search history.

(56) References Cited

U.S. PATENT DOCUMENTS

| 9,939,164 B2* | 4/2018 | Kusukame ......... B60H 1/00742 |
| 2015/0105976 A1* | 4/2015 | Shikii .................... G06F 3/0488 |
| | | 701/36 |
| 2016/0082808 A1 | 3/2016 | Perkins |

* cited by examiner

*Primary Examiner* — Todd M Melton

(57) ABSTRACT

A heating, ventilation and air-conditioning system is provided that includes a memory and a control module. The memory stores settings. The settings are for interior temperatures of a vehicle, a temperature of a steering wheel, and temperatures of seats within the vehicle. The control module: collects data from one or more cameras, where the data corresponds to one or more captured images of an interior cabin of the vehicle; based on the data, displays a thermographic anthropomorphic figure on a display of the vehicle or a mobile device, where the thermographic anthropomorphic figure is a thermogram representative of temperatures of an occupant of the vehicle; receives via a user interface an input from a user to adjust one of the settings; and based on the input from the user, adjusts operation of a first controlled device to change at least one of the temperatures of the occupant.

23 Claims, 11 Drawing Sheets

HVAC SYSTEMS AND METHODS FOR CONTROLLING ZONED INTERIOR TEMPERATURES OF A VEHICLE INCLUDING DISPLAY OF THERMOGRAPHIC ANTHROPOMORPHIC FIGURES

FIELD

The present disclosure relates to heating, ventilating, and air-conditioning (HVAC) systems and, more specifically to in-vehicle zone-based temperature control.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

HVAC systems are used to control temperatures within cabins of vehicles. As an example, a blower is typically used to pass air through a heat exchanger and/or an evaporator. Conditioned air output from the heat exchanger is provided to vents located within a vehicle cabin. Warm air is provided by passing a coolant flowing through an internal combustion engine through the heat exchanger. Air passing through the heat exchanger is heated and then passed through the vents. For an electric vehicle, air is typically heated via electrical heaters and/or heating elements, such as positive temperature coefficient (PTC) resistance heating elements. Cool air is provided by passing air through the evaporator and to the vents.

A traditional HVAC system includes a dashboard mounted user interface for setting temperatures for a driver area, a front seat passenger area and rear seat passenger area. The HVAC system then adjusts temperatures and flow rates of air to vents in a vehicle cabin based on the set temperatures. To adjust direction of the air flow, the vehicle occupants manually move vanes on the vents.

An HVAC system may include infrared sensors to determine skin temperatures of the vehicle occupants. Based on the skin temperatures and predetermined target temperatures, the HVAC system adjusts the temperatures and flow rates of the air supplied to the vents in the vehicle cabin. Although skin temperature of a vehicle occupant is a better indicator of occupant comfort, a thermodynamic environment in a vehicle cabin is complex, as are relationships between HVAC control settings and resulting effects on skin temperatures of each vehicle occupant.

SUMMARY

A heating, ventilation and air-conditioning system is provided that includes a memory and a control module. The memory stores settings. The settings are for interior temperatures of a vehicle, a temperature of a steering wheel, and temperatures of seats within the vehicle. The control module: collects data from one or more cameras, where the data corresponds to one or more captured images of an interior cabin of the vehicle; based on the data, displays a thermographic anthropomorphic figure on a display of the vehicle or a mobile device, where the thermographic anthropomorphic figure is a thermogram representative of temperatures of an occupant of the vehicle; receives via a user interface an input from a user to adjust one of the settings; and based on the input from the user, adjusts operation of a first controlled device to change at least one of the temperatures of the occupant.

In other features, a heating, ventilation and air-conditioning system is provided and includes a control module, an automatic settings module, a personalized settings module, and a manual settings module. The control module is configured to operate in an automatic settings mode, a personalized settings mode, and a manual settings mode. The control module determines whether a vehicle is being used for public use or private use and based on whether the vehicle is being used for public use or private use, determines whether to operate in one of the automatic settings mode, the personalized settings mode, and the manual settings mode. The automatic settings module, while operating in the automatic settings mode, adjusts operation of control devices based on default values for settings to change temperatures of an occupant of the vehicle. The controlled devices include a motor of a vent, a motor of a set of vanes for the vent, and a blower for passing air through the vent. The personalized settings module, while operating in the personalized settings mode, adjusts operation of the control devices based on personal preference values for the settings. The manual settings module, while operating in the manual settings mode, adjusts operation of the control devices based on inputs received from a user.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

HVAC systems and control methods are disclosed herein that include operation in an automatic settings mode, a personalized settings mode, and a manual settings mode. The modes include regulated control of settings, such as: air temperatures and velocities of zones for each of a driver, a front seat passenger, and rear seat passengers; a temperature of a steering wheel; and temperatures of portions of seats. The modes also include position control of vents and corresponding vanes. This regulation and position control is provided with or without inputs from vehicle occupants. The automatic settings mode includes regulation and position control based on default or predefined settings for vehicle occupants. The personalized settings mode includes regulation and position control based on personalized settings of vehicles occupants while allowing personalized settings to be changed and/or new settings to be created. The manual settings mode allows for manual adjustment of settings.

Figure 1:
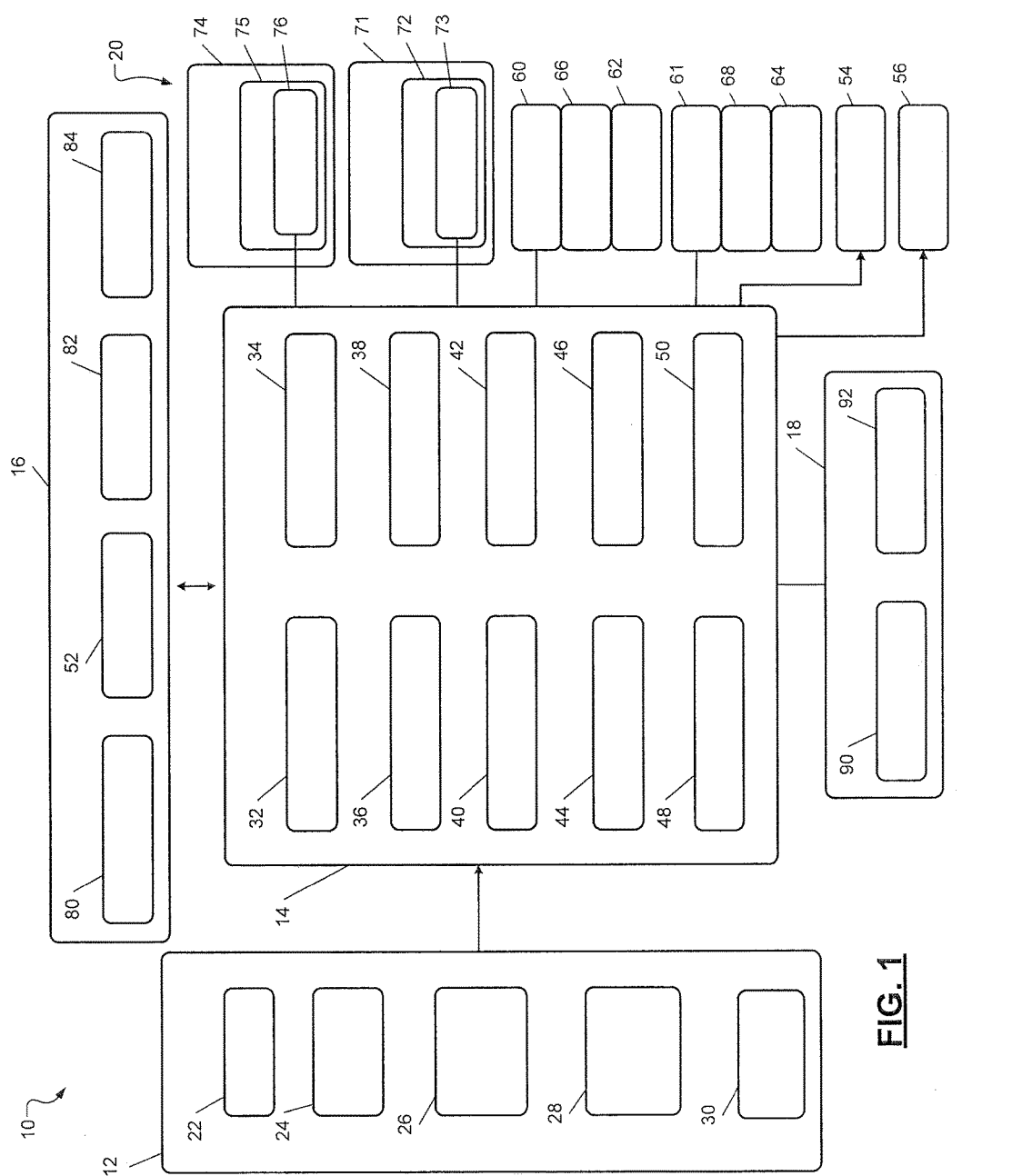
FIG. 1 is a functional block diagram of an example of a HVAC system in accordance with an embodiment of the present disclosure.

FIG. 1 shows a functional block diagram of an example of a HVAC system 10 that includes sensors 12, a control module 14, user interfaces 16, memory 18, and controlled devices 20. The sensors 12 may include cameras 22, occupant sensors 24, interior temperature sensors 26, exterior temperature sensors 28, and sun load sensors 30. The cameras 22 may include occupant position cameras, infrared cameras, and/or other cameras located within a vehicle cabin. The occupant sensors 24 may include pressure sensors, strain gauges, piezo-electric or piezo-resistive sensors, and/or other sensors for detecting: presence of vehicle occupants in seats of the vehicle; sizes, weights, and/or heights of the vehicle occupants; and/or other characteristics of the vehicle occupants. The interior temperature sensors 26 detect interior temperatures within the vehicle cabin. The exterior temperature sensors 28 detect temperatures exterior to the vehicle and/or an ambient temperature. The sun load sensors 30 may, for example, include photodiodes and detect amounts of sun light being received within the vehicle at respective locations of the sun load sensors 30.

The control module 14 may include an automatic settings module 32, a personalized settings module 34, and a manual setting module for performing operations while respectively in the automatic setting mode, the personalized setting mode, and the manual setting mode. The control module 14 may further include a cabin comfort module 38, a display module 40, a setting adjustment module 42, a point control module 44, a flow control module 46, a seat module 48 and a steering wheel module 50.

The cabin comfort module 38 performs a cabin comfort method (or process), which is further described below with respect to FIG. 10. The display module 40 controls operation of display 52 (e.g., a touchscreen). The setting adjustment module 42 may adjust settings, not adjusted by the modules 32, 34, 36, 38, 48, 50 and/or control operation of the controlled devices 20. As an example, the setting adjustment module 42 may control operation of a compressor/pump 54 of a vehicle air-conditioning system and/or operation of a coolant pump 56. The point control module 44 controls operation of motors 60, 61 to move vanes 62 and vents 64. The vanes 62 may be included in assemblies of the vents 64. Each of the vents 64 may include one or more groups of the vanes 62. The motors 60, 61 may be connected to the vanes 62 and vents 64 via vane actuator assemblies 66 and vent actuator assemblies 68. The motors 60, 61 may be, for example, servomotors and may include gears, fasteners, links, and/or other devices for attaching the motors 60, 61 to the actuator assemblies 66, 68. The actuator assemblies 66, 68 may include gears, links, springs, magnets, shafts, fasteners, etc. The actuator assemblies 66, 68 are used to move the vanes and vents.

The flow control module 46 controls operation of blowers 70 to adjust velocities (or flow rates) of air flowing through the vents 64. The seat module 48 controls operation of seat temperature control systems 71 of seats 72. The seat temperature control systems 71 may include temperature control devices 73, such as heating elements, cooling fans, power supplies, one or more compressors/pumps, etc. for controlling temperatures of the seats 72. This may include supplying current to the heating elements and/or control signals to the cooling fans and one or more compressors/pumps. The steering wheel module 50 controls operation of a steering wheel heating system 74 of a steering wheel 75 including supplying current to one or more heating elements 76 in a steering wheel 75 of the vehicle. The steering wheel heating system 74 may include a power supply and/or one or more switches for supplying current to the one or more heating elements 76. The modules 40, 42, 44, 46, 48, 50 may be controlled by the modules 32, 34, 36, 38.

Figure 2:
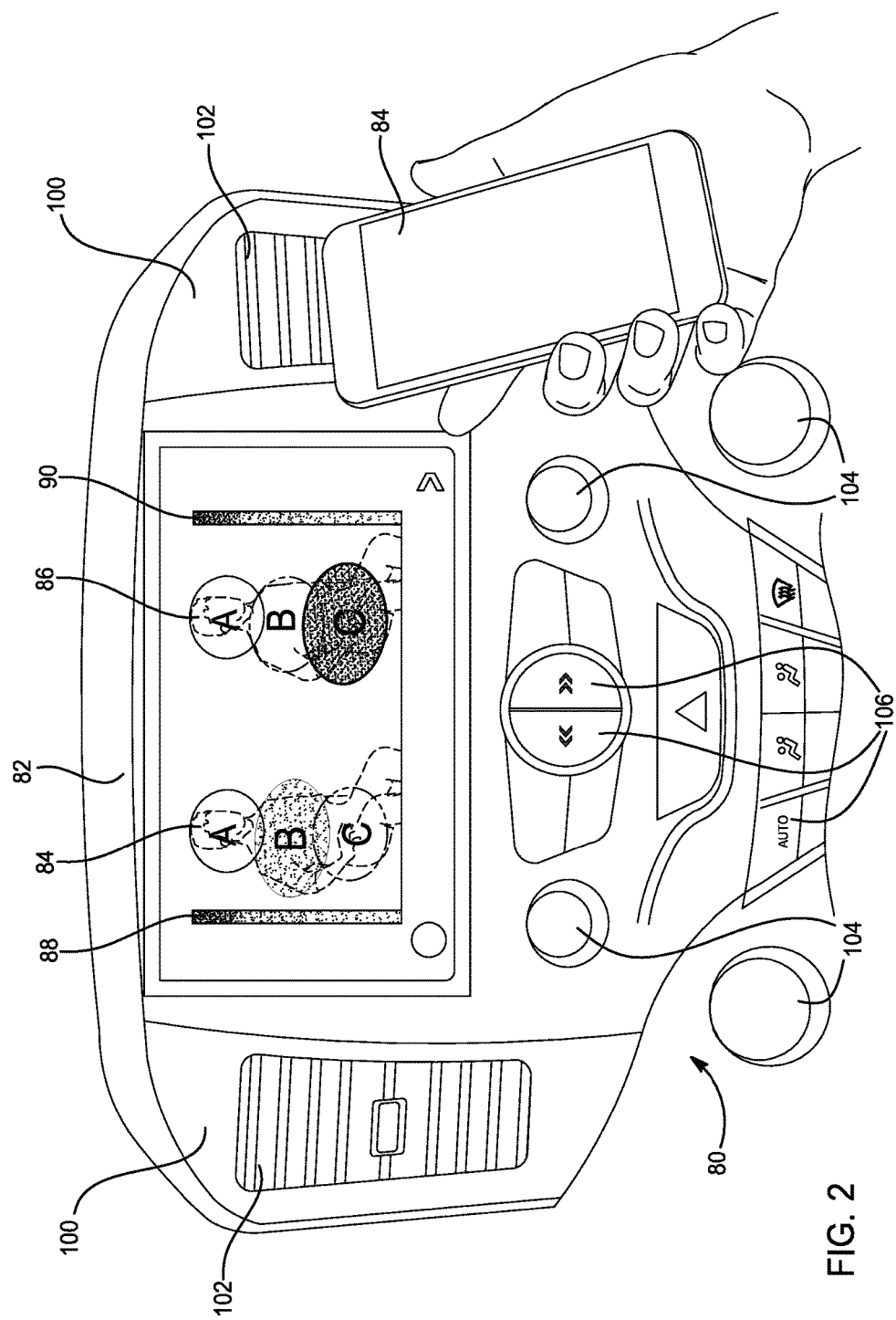
FIG. 2 is a front view of an example of a dashboard HVAC control interface including a display showing zones over perspective views of thermographic anthropomorphic figures of vehicle occupants in accordance with an embodiment of the present disclosure.
Figure 3:
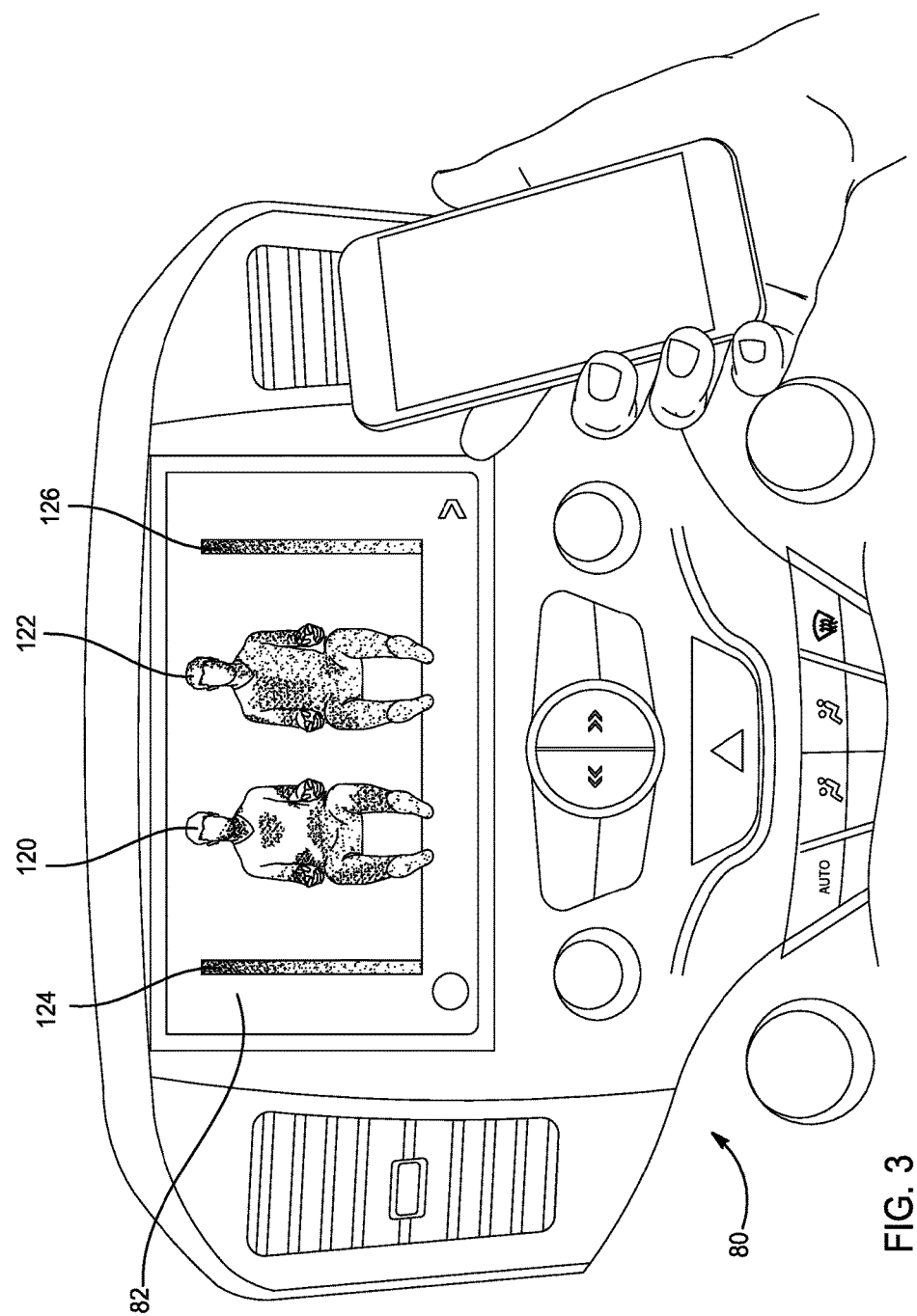
FIG. 3 is a front view of the dashboard HVAC control interface of FIG. 2 including the display showing front views of thermographic anthropomorphic figures of vehicle occupants in accordance with an embodiment of the present disclosure.
Figure 4:
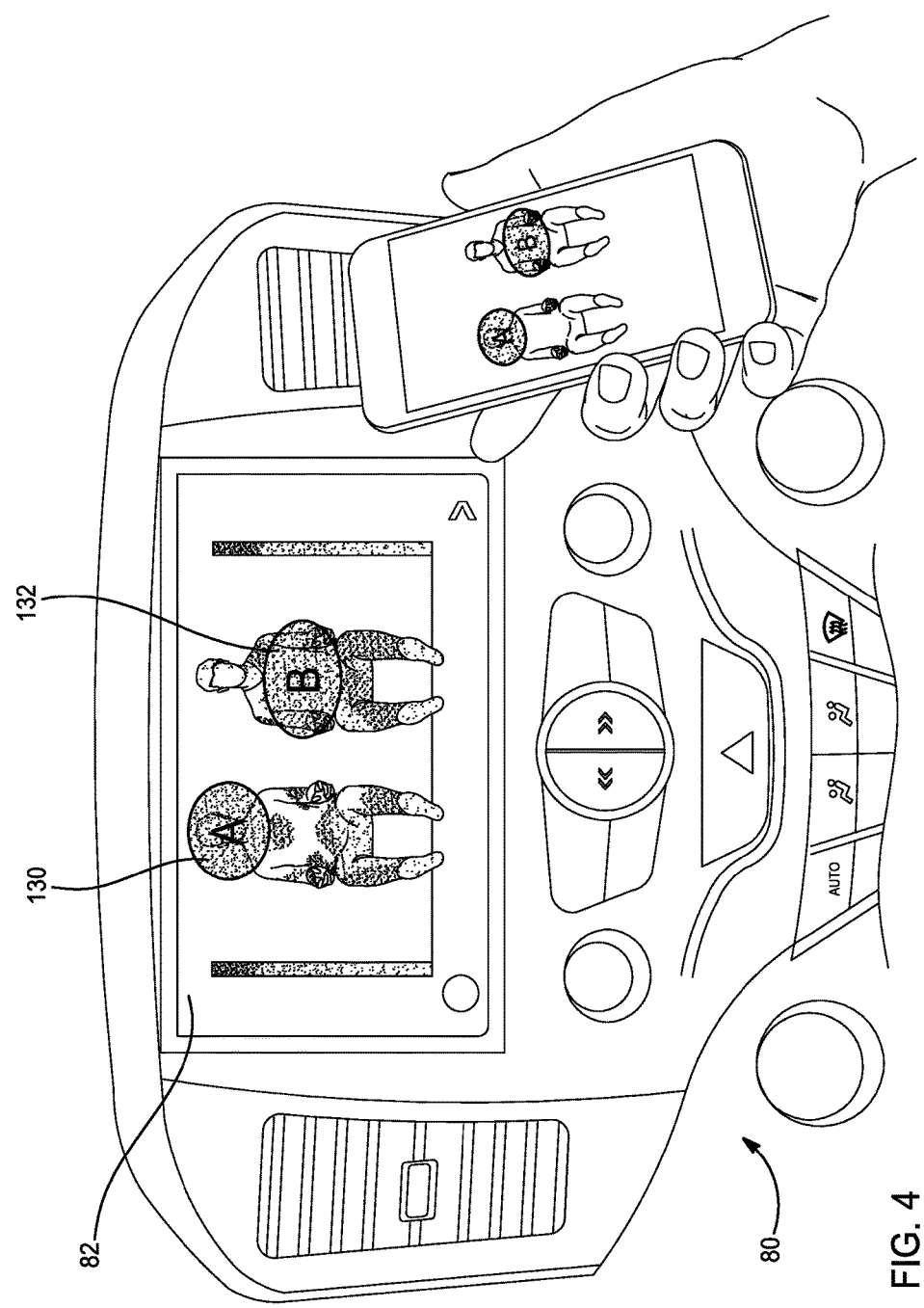
FIG. 4 is a front view of the dashboard HVAC control interface of FIG. 2 including the display showing certain selected zones over front views of thermographic anthropomorphic figures of vehicle occupants in accordance with an embodiment of the present disclosure.

The user interfaces 16 include a dashboard HVAC control interface 80, the display 52, a steering wheel interface 82 and one or more mobile devices 84. An example of the dashboard HVAC control interface 80 is shown in FIGS. 2-4. The steering wheel interface 82 is mounted on the steering wheel 75. In an embodiment, the steering wheel interface 82 includes buttons on the steering wheel 75 that may be pressed by a vehicle driver. The mobile devices 84 may include mobile phones, tablets, personal computers, wearable devices, etc. Each of the mobile devices 84 may include a processor, memory, and a transceiver. The memory of each of the mobile devices 84 may store an application executable on the corresponding processor. The application, when executed, allows the mobile devices to communicate with the control module 14. The transceivers of the mobile devices 84 may wirelessly communicate with the control module 14 and/or a transceiver included in or separate from and connected to the control module 14. The interfaces 52, 80 and 82 may communicate with the control module 14 wirelessly or via a wired connection.

Each of the interfaces 16 may include buttons, knobs, dials, switches, touchscreens, microphones, and/or other user interface devices used to receive user inputs. Each of the interfaces 16 may be used to adjust: temperatures and/or velocities of air flow through the vents 64; temperatures and/or velocities of air flow to zones in within a vehicle cabin; aiming directions of the vanes 62 and vents 64; and temperatures of the seats 73 and steering wheel 75.

The memory 18 stores default/predefined settings 90 and user preference settings 92. The information stored in the memory 18 including settings may be stored in the mobile devices 84 and downloaded to the control module 14 and/or the memory 18. The default/predefined settings 90 may be settings predetermined for vehicle occupants based on size, weight, height and/or other occupant characteristics. The user preference settings 92 are settings set by a vehicle occupant and may be recalled for the vehicle occupant and the corresponding seat that the vehicle occupant is sitting on. The user preference settings 92 may be set by any of the user interfaces 16. The controlled devices 20 include: the motors 60, 61; blowers 70; seat temperature control system elements, such as power supplies, switches, cooling fans, compressors; steering wheel heating system elements, such as power supplies and switches; the compressor 54; and the coolant pump 56.

Referring now also to FIG. 2, which shows an example of the dashboard HVAC control interface 80 including a display 82 showing zones A-C over perspective views of thermographic anthropomorphic FIGS. 84, 86 of vehicle occupants. The thermographic anthropomorphic FIGS. 84, 86 represent the vehicle occupants and are shaded and/or colored to indicate temperatures of portions of the vehicle occupants. As an example, the cameras 22 may capture infrared images from which thermograms are generated and displayed on the display 52. Temperature bars 88, 90 are displayed to indicate temperatures corresponding to the displayed shading/coloring of the thermographic anthropomorphic FIGS. 84, 86.

In the example shown, zones A-C are shown for each vehicle occupant. Any number of zones may be controlled for each vehicle occupant. This includes zones in front, middle, and/or a last seating row of a vehicle. The zones may be circular, semi-circular, spherical, oval, or rectangular shaped or may take on some other shape(s). The shapes of the zones may be dependent on the patterns of air flows out of the vents 64. Zone C is darkened for the thermographic anthropomorphic FIG. 86 as this zone has been selected for adjustment. In FIG. 2, two vents 100 and two sets of vanes 102 are shown.

The dashboard HVAC control interface 80 further includes knobs 104 and buttons 106 for providing user inputs to activate systems and elements of the HVAC system 10 and/or to enter and/or adjust settings of the HVAC system 10. FIG. 2 also shows an example of one of the mobile device 84. Control of the HVAC system 10 may be controlled via the mobile device 84.

FIG. 3 shows the example dashboard HVAC control interface 80 including the display 82 showing front views of thermographic anthropomorphic FIGS. 120, 122 of vehicle occupants. Temperature bars 124, 126 are displayed to indicate temperatures corresponding to the displayed shading/coloring of the thermographic anthropomorphic FIGS. 120, 122.

FIG. 4 shows the example dashboard HVAC control interface 80 including the display 82 showing certain selected zones 130, 132 over front views of thermographic anthropomorphic figures of vehicle occupants. Zones may be selected by vehicle occupants and corresponding settings may be adjusted to adjust the temperatures and velocities of air flow to the selected zones.

Figure 5:
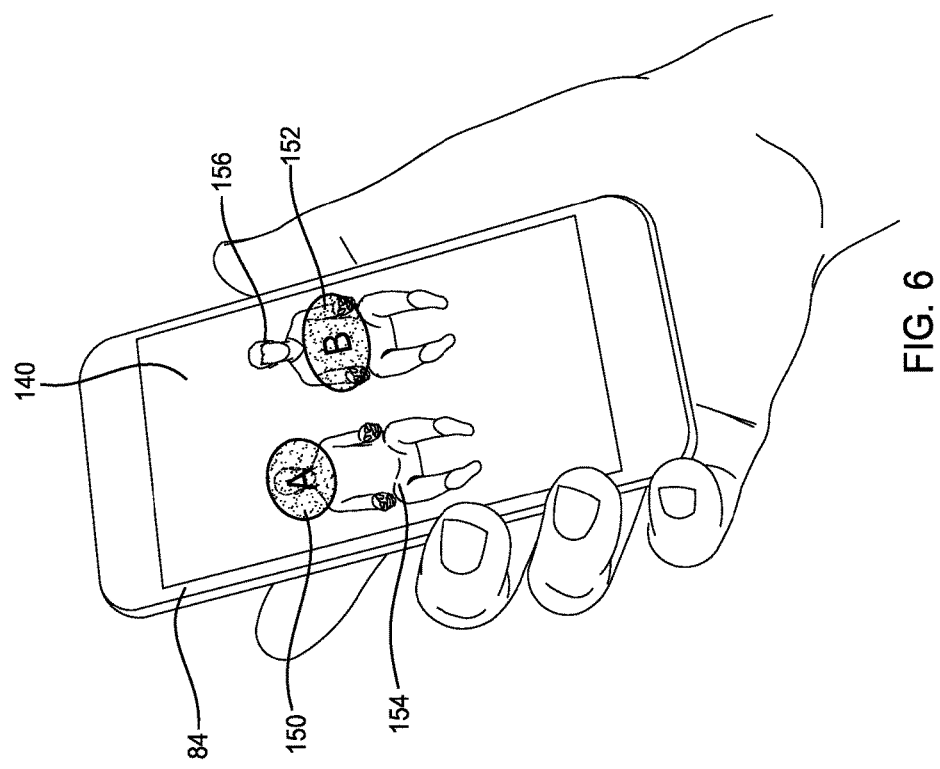
FIG. 5 is a front view of an example of a mobile device including a display showing zones over a perspective view of a thermographic anthropomorphic figure of a vehicle occupant in accordance with an embodiment of the present disclosure.

FIG. 5 shows an example of one of the mobile devices 84 including a display 140 showing zones A-C over a perspective view of a thermographic anthropomorphic FIG. 142 of a vehicle occupant. The thermographic anthropomorphic FIG. 142 may be representative of the vehicle occupant operating the mobile device 84. Zone C is darkened for the thermographic anthropomorphic FIG. 142 as this zone has been selected for adjustment.

Figure 6:
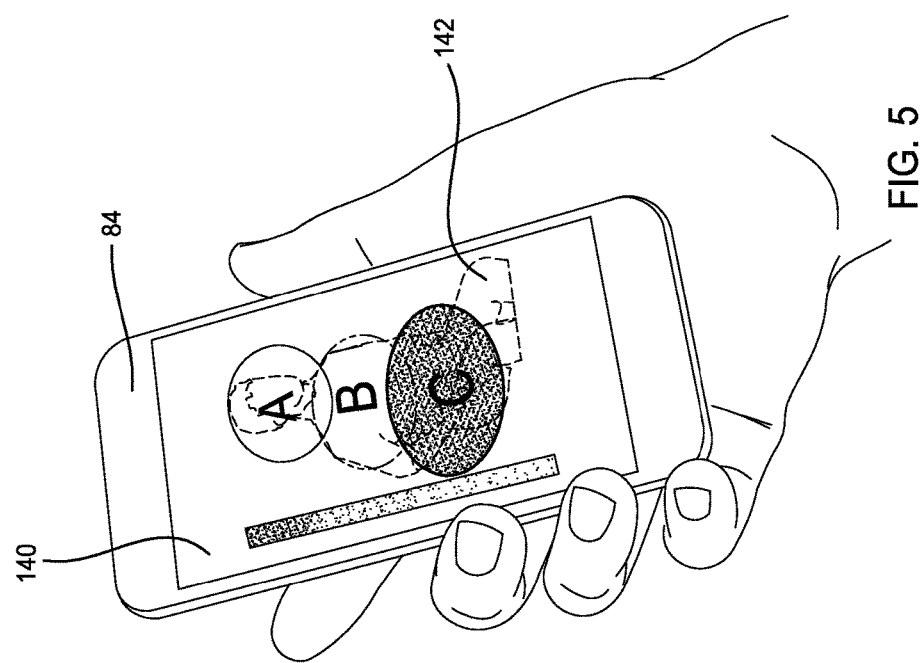
FIG. 6 is a front view of the mobile device of FIG. 5 including the display showing certain selected zones over a front view of thermographic anthropomorphic figures of vehicle occupants in accordance with an embodiment of the present disclosure.

FIG. 6 shows the mobile device 84 including the display 140 showing certain selected zones 150, 152 over a front view of thermographic anthropomorphic FIGS. 154, 156 of vehicle occupants. Zones may be selected by vehicle occupants and corresponding settings may be adjusted to adjust the temperatures and velocities of air flow to the selected zones.

The thermographic anthropomorphic figures and/or zones shown in FIGS. 2-6 may be displayed during any of the methods described with respect to FIGS. 7-12. For further defined structure of the modules of FIG. 1 see below provided methods of FIGS. 7-12 and below provided definition for the term "module". Also, various display operations are described with respect to the methods of FIGS. 7-12. Each of the display operations may include displaying data, settings, preferences, parameters (e.g., parameters of the controlled devices 20, such as current, voltage, power, ON/OFF states, duty cycle, frequency, etc.), characteristics, etc. on any of the displays of the user interfaces 16. In addition, relationships between the data, settings, parameters and characteristics may be stored in tabular form in the memory 18 and accessed when controlling operation of the controlled devices 20.

Figure 7:
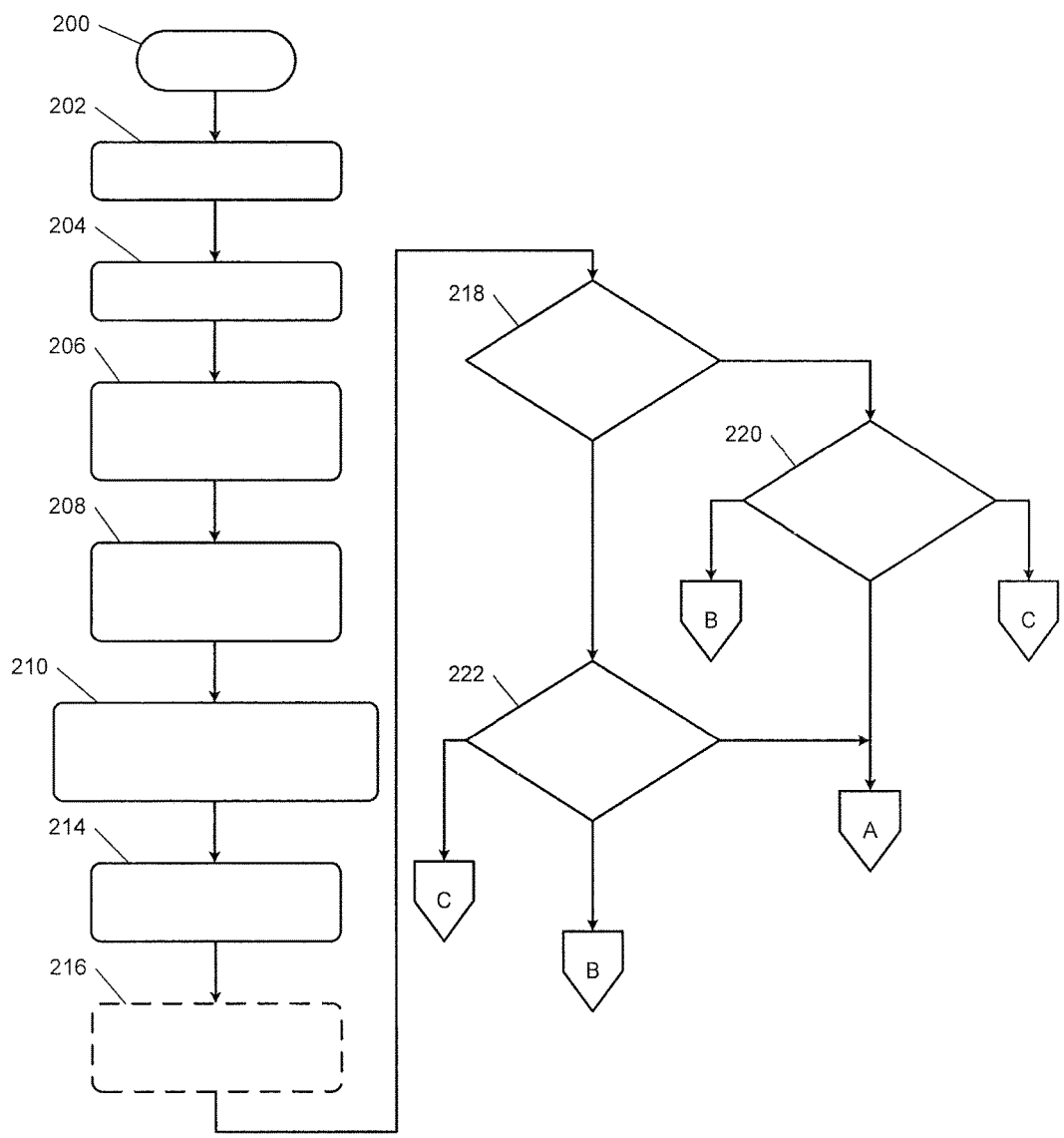
FIG. 7 illustrates a method of selecting a mode of operation for a HVAC system in accordance with an embodiment of the present disclosure.

The systems disclosed herein may be operated using numerous methods, example methods are illustrated in FIGS. 7-12. In FIG. 7, a method of selecting a mode of operation for the HVAC system 10 is shown. Although the following methods are shown as separate methods, one or more methods and/or operations from separate methods may be combined and performed as a single method. The operations of FIG. 7 may be iteratively performed. The method may begin at 200. At 202, the HVAC system 10 is activated. The HVAC system 10 may be activated via any of the interfaces 16. The HVAC system 10 may be activated within the vehicle or remotely via one of the mobile devices 84 or a key fob. The control module 14 sets default settings. This may include accessing the default settings 90.

At 206, the control module 14 controls the controlled devices 20 and performs the above-described regulation based on the default settings to precondition the vehicle cabin. At 208, the occupant sensors 24 and/or the cameras 22 may detect that a vehicle operator and/or user has entered and is on one or more seats of the vehicle.

At 210, the sensors 22, 26, 28, 30 detect interior temperatures, exterior temperatures, and sun loading levels. The interior temperatures may include air temperatures and/or temperatures of the vehicle occupants. At 214, sensors 22, 24 may be used to detect and/or identify occupants and/or positions of the occupants (e.g., which occupant is seated on which seat of the vehicle).

At 216, the control module 14 via one of the user interfaces 16 may ask vehicle occupants where the occupants are positioned in the vehicle. In one embodiment, operation 216 is not performed. In another embodiment, operation 216 is performed if the positions are not already known and/or to confirm the positions already determined at 214.

At 218, the control module 14 determines whether the vehicle is for private or public use. In one embodiment, the control module 14 asks the vehicle owner, vehicle occupants and/or the driver of the vehicle whether the vehicle is for private or public use. This may be done via one or more of the interfaces 16. In another embodiment, a private/public indicator value is stored in the memory 18 and indicates whether the vehicle is for private or public use. This value is accessed by the control module 14. An example, of private use is when the vehicle is privately owned and operated by the vehicle owner. Some examples of public use are when the vehicle: is rented to the public; is shared by members of an organization; and/or is used to provide transportation services. If the vehicle is being used for private use, operation 220 is performed. If the vehicle is being used for public use, operation 222 is performed.

Figure 8:
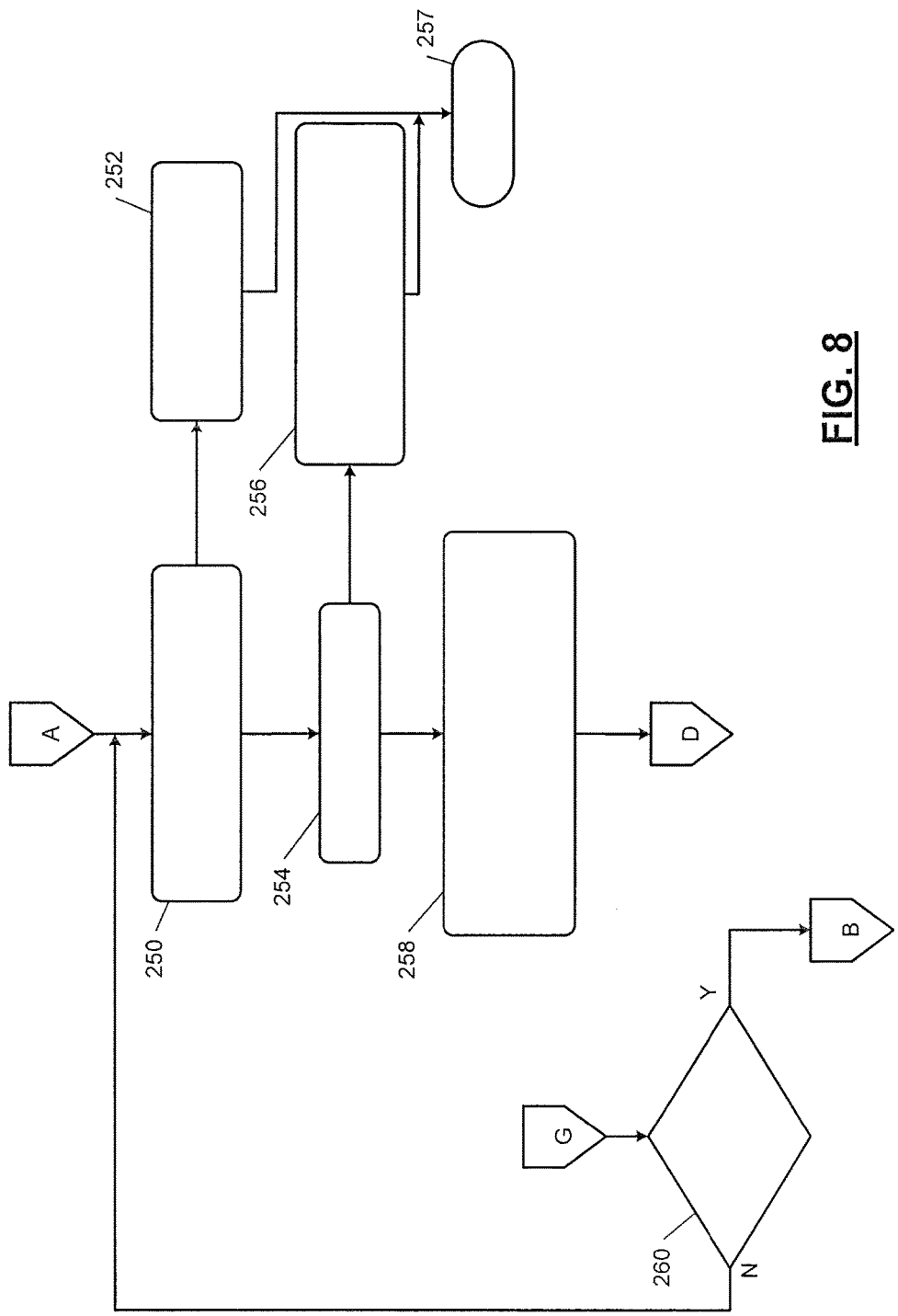
FIG. 8 illustrates a method of operating in an automatic settings mode in accordance with an embodiment of the present disclosure.
Figure 9:
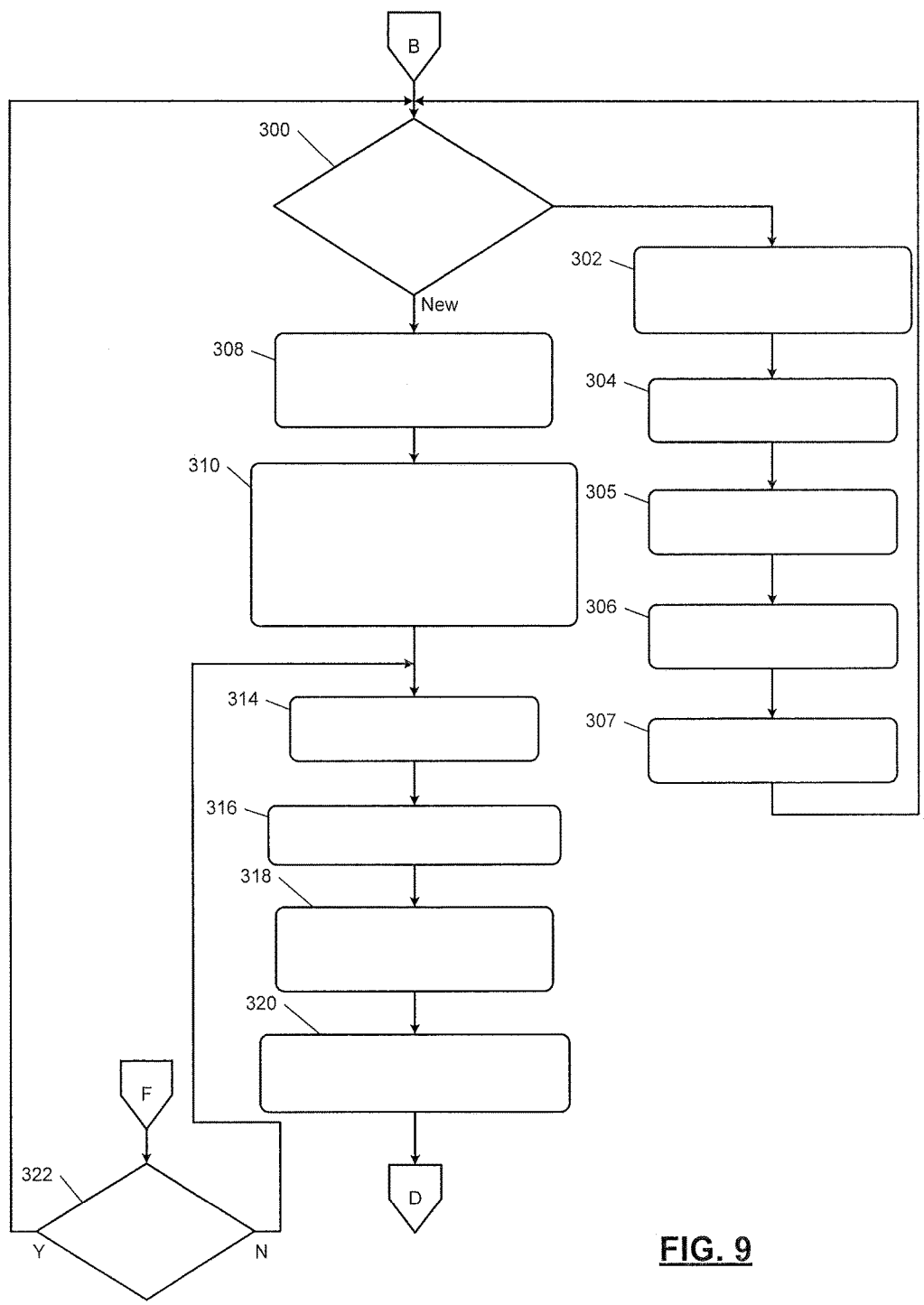
FIG. 9 illustrates a method of operating in a personalized settings mode in accordance with an embodiment of the present disclosure.

At 220, the control module 14 determines whether the HVAC system 10 is operating in the automatic settings mode, the personalized settings mode, or the manual settings mode. This may be based on a mode value stored in the memory 18 and indicating the operating mode. This mode value may be changed by a vehicle owner, driver, and/or vehicle occupant. The HVAC system 10 may be operating in same or different modes for different zones and/or areas in the vehicle cabin. An area may include one or more zones. For example, the HVAC system 10 may be operating in the personalized settings mode for an area corresponding to the driver seat and may operate in the automatic settings mode for other areas in the vehicle cabin. As a result, one or more of the methods of FIGS. 7-12 may be performed during a same time period. If the automatic settings mode is active for one or more zones and/or areas, the method of FIG. 8 is performed. If the personalized settings mode is active for one or more zones and/or areas, the method of FIG. 9 is performed. If the manual settings mode is performed for one or more zones and/or areas, the method of FIG. 12 is performed.

At 222, the control module 14 determines whether the HVAC system 10 is operating in the automatic settings mode, the personalized settings mode, or the manual settings mode. In one embodiment and while being used for public use, the personalized settings mode and/or the manual settings mode are not available as options. This prevents a vehicle occupant from creating and/or selecting settings that may be undesirable to the vehicle occupant and/or other vehicle occupants. Preventing operation in the personalized settings mode and/or the manual settings mode also assures that default settings, which are predetermined to be at least satisfactory for a large number of possible vehicle occupants, are maintained over multiple uses of the vehicle. If the automatic settings mode is active for one or more zones and/or areas, the method of FIG. 8 is performed. If the personalized mode is active for one or more zones and/or areas, the method of FIG. 9 is performed. If the manual settings mode is performed for one or more zones and/or areas, the method of FIG. 12 is performed.

In FIG. 8, a method of operating in the automatic settings mode is shown. The operations of FIG. 8 may be iteratively performed. The method may begin at 250. At 250, the sensors 22, 26, 28, 30 detect interior temperatures, exterior temperatures, and sun loading. At 252, the automatic settings module 32, via the controlled devices 20, regulates interior temperatures based on the default settings, calibrated setting values predetermined for different operating environments, the interior temperatures, the exterior temperatures, the sun loading and the occupant characteristics. This may include regulating temperatures of air in the vehicle cabin, steering wheel temperature, and seat temperatures to adjust temperatures of vehicle occupants.

The control module 14 may set priorities to zones and/or permitted adjustment of settings based on the public/private use and/or the selected mode of operation. For example, while being used for public use and/or while operating in the personalized settings mode, a higher priority level in controlling temperatures of zones may be provided to passengers than to a driver. As a result, a higher priority level is provided to user interfaces controlled by the passengers than to user interfaces controlled by the driver. As another example, while being used for private use and/or while being operated in the personalized mode, a higher priority level in controlling temperatures of zones may be provided to a driver than to passengers. As a result, a higher priority level is provided to user interfaces controlled by the driver than to user interfaces controlled by the passengers.

At 254, the cameras 22 collect camera data and provide the data as feedback to the control module 14. At 256, the automatic settings module 32, via the controlled devices 20, positions the vanes 62 and vents 64 and regulates air velocities through the vents 64. This may include turning off air flow to one or more of the vents 64. The positioning and regulating may be based on the default settings, calibrated setting values predetermined for different operating environments, the interior temperatures, the exterior temperatures, the sun loading values and/or the occupant characteristics. Subsequent to operations 252, 256, the automatic settings method may end at 257 or return to operation 250.

Operation 258 may be performed subsequent to operation 254. At 258, the automatic settings module 32 obtains user settings for corresponding interior temperatures, exterior temperatures, and sun loading values. The settings, temperatures and values may be stored in the memory 18. The method of FIG. 10 may be performed subsequent to operation 258.

At 260, the automatic settings module 32 determines whether settings have been changed by a user (e.g., vehicle occupant). If yes, the method of FIG. 9 is performed, otherwise operation 250 may be performed. Operation 260 may be performed subsequent to operation 364 of FIG. 10.

In FIG. 9, a method of operating in the personalized settings mode is shown. The operations of FIG. 9 may be iteratively performed. The method may begin at 300. At 300, the personalized settings module 34 determines whether to use a predefined group of settings or create a new group of settings. This may be based on a user input from one of the user interfaces 16. In one embodiment, the user is asked whether to use a predefined group of settings or create a new group of settings. If a predefined group of settings is used, operation 302 is performed. At 302, the personalized settings module 34 searches for and displays personalized settings and/or default settings including interior temperatures, air flow velocities, preferences for aiming point/zone priorities for heater and air-conditioning modes, a steering wheel temperature, and seat temperatures. As an example, identifiers (IDs) of the personalized settings and/or default settings may be displayed. In one embodiment, each group of personalized settings and/or default settings has a respective ID, which may include a name of a corresponding vehicle occupant. At 304, the personalized settings module 34 receives a user input from one of the user interfaces 16 selecting a group of settings. At 305, the personalized settings module 34 or the display module 40 may display the settings of the selected group.

At 306, the user may adjust the displayed settings via one of the user interfaces 16. At 307, the personalized settings module 34 may store the selected settings in the memory 18. The updated settings may be stored as the same selected group or as a new group of settings. Operation 314 may be performed subsequent to operation 307.

At 308, the personalized settings module 34 accesses initial default and/or user preference settings for the personalized settings (or semi-automatic) mode. The personalized settings module 34 or the display module 40 displays the initial default and/or user preference settings. The personalized settings module 34 may ask the user for the preference settings. At 310, the personalized settings module 34 requests preferences for interior temperatures, air flow velocities, preferences for aiming point/zone priorities for heater and air-conditioning modes, a steering wheel temperature, and seat temperatures. The personalized settings module 34 may ask the user predefined questions to determine the preferences and adjust current and/or signals to the controlled devices 20 based on differences between current temperatures and the user preferences. In one embodiment, the personalized settings module 34 asks the user whether the user prefers that air flow be directed to a certain portion (e.g., a head) of the user's body or elsewhere to control a temperature of one or more zones of the interior cabin of the vehicle.

At 314, the personalized settings module 34 receives feedback from the cameras 22 by collecting data from the cameras 22 to detect temperatures of zones. At 316, the personalized settings module 34 regulates interior temperatures by adjusting temperatures of air flow to vents 64 to selected settings.

At 318, the personalized settings module 34 detects, via the sensors 22, 26, 28, 30 interior temperatures, exterior temperatures, and sun loading values. At 320, the personalized settings module 34 adjusts positions of the vanes 62 and the vents 64 and regulates velocities of air flowing to the vents 64 to selected settings.

At 322, the personalized settings module 34 determines whether settings have been changed by a user (e.g., vehicle occupant). If yes, operation 300 is performed, otherwise operation 314 may be performed. Operation 322 may be performed subsequent to operation 364 of FIG. 10 or operation 436 of FIG. 11.

Figure 10:
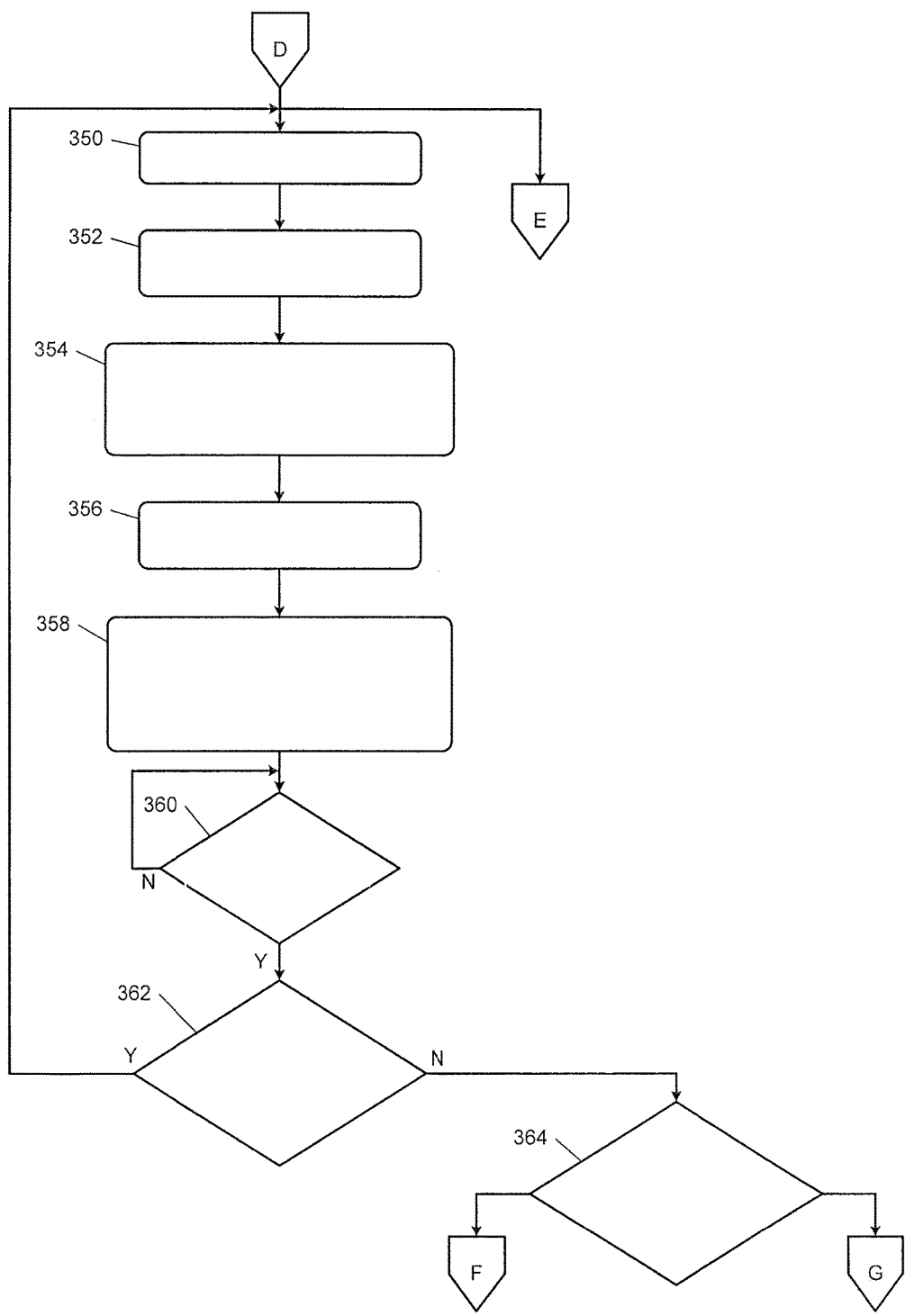
FIG. 10 illustrates a cabin comfort method in accordance with an embodiment of the present disclosure.

In FIG. 10, the cabin comfort method is shown. The operations of FIG. 10 may be iteratively performed. The method may begin at 350. At 350, the cabin comfort module 38 adjusts temperatures of seats based on seat temperature settings determined prior to operation 350. At 352, the cabin comfort module 38 adjusts a steering wheel temperature based on a steering wheel temperature setting determined prior to operation 352.

At 354, the cabin comfort module 38 or the display module 40 displays current settings of HVAC system 10 including interior temperatures, air flow velocities, and aiming points/zones. At 356, the cabin comfort module 38 or the display module 40 displays thermographic anthropomorphic figure(s) on one or more of the displays of the vehicle and/or one or more mobile devices (e.g., one or more of the displays 52, 82, 140 of FIGS. 1-6). A thermographic anthropomorphic figure may be displayed for each occupant and provides temperature feedback information to improve occupant experience. The temperatures indicated by the thermographic anthropomorphic figures are indicative of comfort of the occupants.

At 358, the cabin comfort module 38 stores occupant air flow velocities and aiming point settings for current exterior temperatures, interior temperatures, and sun loading values. At 360, the cabin comfort module 38 determines whether the cabin comfort process is completed. If the cabin comfort process is completed, operation 362 is performed. In an embodiment, the cabin comfort process is complete when operations 350-358 and operations 400-434 of FIG. 11 are completed.

At 362, the cabin comfort module 38 determines whether to repeat setting process of the cabin comfort method for same or different occupant. If the setting process is repeated, operation 350 is performed, otherwise operation 364 is performed. At 364, the cabin comfort module 38 proceeds to operation 260 of FIG. 8 if operating in the automatic settings mode and to operation 322 of FIG. 9 if operating in the personalized settings mode.

Figure 11:
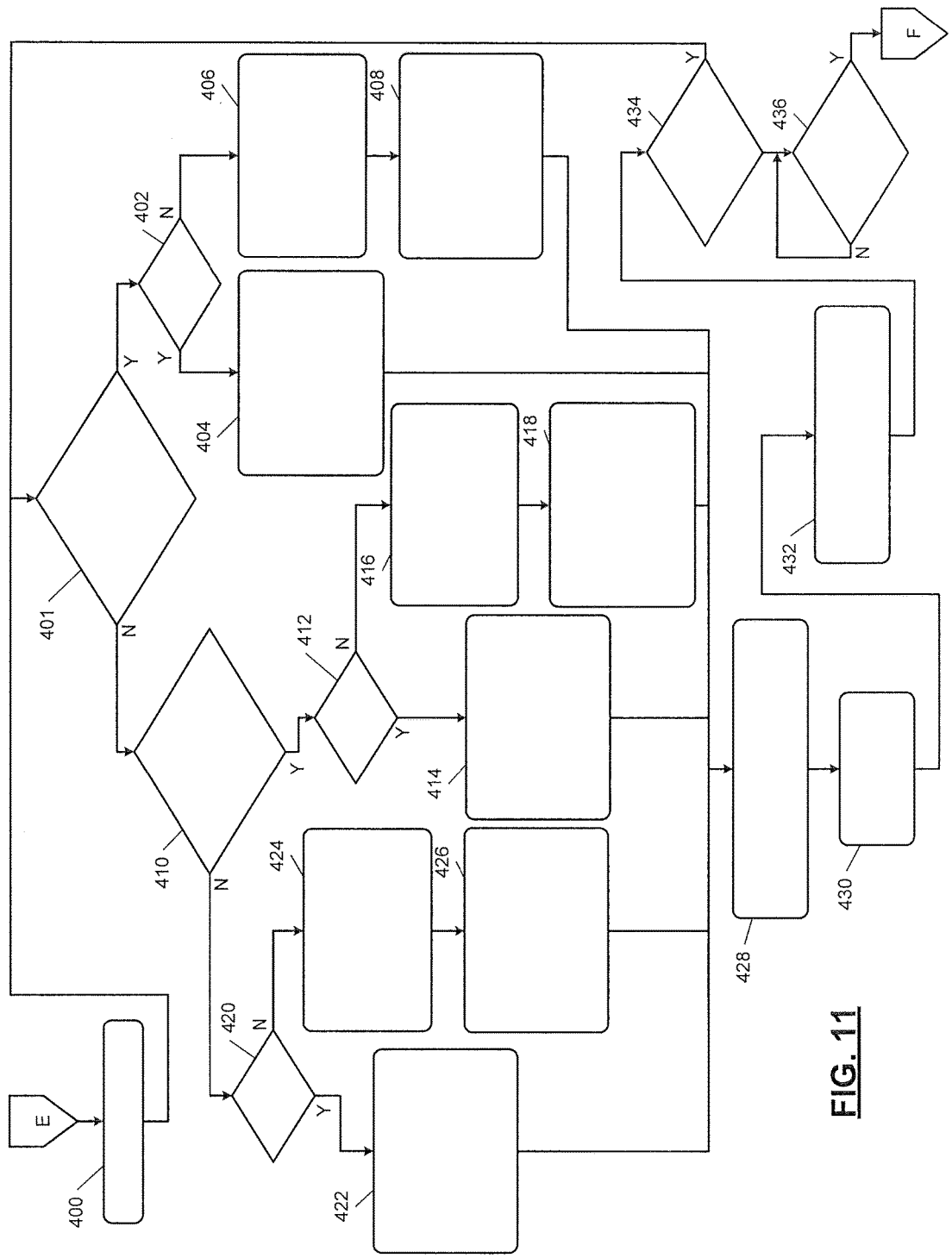
FIG. 11 illustrates a method of adjusting temperatures, and velocities of air flows and aiming vanes and vents as part of the cabin comfort method of FIG. 10.
Figure 12:
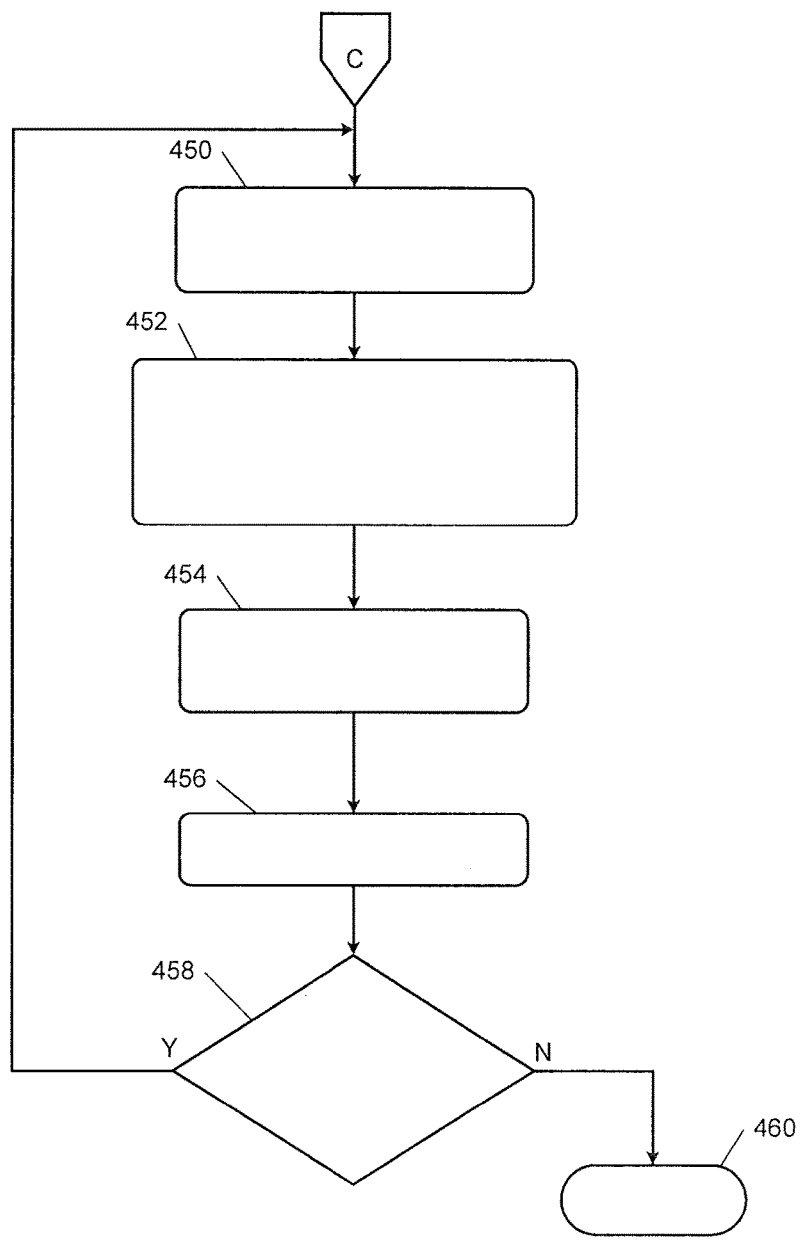
FIG. 12 illustrates a manual method in accordance with an embodiment of the present disclosure.

In FIG. 11, a method of adjusting temperatures, and velocities of air flows and aiming vanes and vents as part of the cabin comfort method of FIG. 10 is shown. The operations of FIG. 11 may be iteratively performed. The operations of FIG. 11 may be performed by the cabin comfort module 38 and/or the setting adjustment module 42 ("the modules 38, 42"). The method may begin at 400. At 400, data from the cameras 22 is collected.

At 401, the modules 38, 42 determine whether the temperature of a first zone (e.g., zone A) is greater than temperatures of second and third zones (e.g., zones B, C). If yes, operation 402 is performed, otherwise operation 410 is performed.

At 402, the modules 38, 42 determine whether default settings are being used. If yes, operation 404 is performed, otherwise operation 406 is performed. At 404, the modules 38, 42 or the display module 40 displays default values for a temperature of the first zone, an air flow velocity of the first zone, and the aiming point/area for the first zone. At 406, the modules 38, 42 identify user preferences of the values for a temperature of the first zone, an air flow velocity of the first zone, and the aiming point/area for the first zone. At 408, the modules 38, 42 or the display module 40 displays preferences of the values of the temperature of the first zone, the air flow velocity of the first zone, and the aiming point/area for the first zone.

At 410, the modules 38, 42 determine whether the temperature of a second zone (e.g., zone B) is greater than temperature of the third zone (e.g., zone C). If yes, operation 412 is performed, otherwise operation 420 is performed At 412, the modules 38, 42 determine whether default settings are being used. If yes, operation 414 is performed, otherwise operation 416 is performed. At 414, the modules 38, 42 or the display module 40 displays default values for a temperature of the second zone, an air flow velocity of the second zone, and the aiming point/area for the second zone. At 416, the modules 38, 42 identify user preferences of the values for a temperature of the second zone, an air flow velocity of the second zone, and the aiming point/area for the second zone. At 418, the modules 38, 42 or the display module 40 displays preferences of the values of the temperature of the second zone, the air flow velocity of the second zone, and the aiming point/area for the second zone.

At 420, the modules 38, 42 determine whether default settings are being used. If yes, operation 422 is performed, otherwise operation 424 is performed. At 422, the modules 38, 42 or the display module 40 displays default values for a temperature of the third zone, an air flow velocity of the third zone, and the aiming point/area for the third zone. At 424, the modules 38, 42 identify user preferences of the values for a temperature of the third zone, an air flow velocity of the third zone, and the aiming point/area for the third zone. At 426, the modules 38, 42 or the display module 40 displays preferences of the values of the temperature of the third zone, the air flow velocity of the third zone, and the aiming point/area for the third zone.

At 428, the modules 38, 42 adjust interior temperatures, air flow velocities and positions of vanes and vents based on appropriate settings. The interior temperatures, air flow velocities and positions of the vanes and vents are adjusted based on the last settings displayed according to one of operations 404, 408, 414, 418, 422, 426. At 430, the modules 38, 42 collect data from cameras 22. At 432, the modules 38, 42 or the display module 40 displays thermographic anthropomorphic figures based on the camera data.

At 434, the modules 38, 42 determine whether settings have been changed by a user (e.g., vehicle occupant). When settings are changed, control of the controlled devices 20 is adjusted accordingly. If yes, operation 401 is performed, otherwise operation 436 may be performed.

At 436, the modules 38, 42 determine whether the cabin comfort process is completed. If the cabin comfort process is completed, operation 322 of FIG. 9 may be performed. In an embodiment, the cabin comfort process is complete when operations 350-358 of FIG. 10 and operations 400-434 of FIG. 11 are completed.

In FIG. 12, a method of operating in the manual mode is shown. The operations of FIG. 12 may be iteratively performed. The method may begin at 450. At 450, the manual settings module 36 or the display module 40 displays options for tuning settings. At 452, the manual settings module 36 receives inputs from one or more of the user interfaces 16 to adjust one or more settings for one or more zones, areas, steering wheel, and/or portions of seats. The user inputs may be received via any of the user interfaces 16. The user inputs, as well as any of the other user inputs described herein, may be voice inputs. As during the methods of FIGS. 9-11, the user may select direction of air flow out of one or more of the vents 64 to zones associated with, for example, a face, chest, stomach, left shoulder, right shoulder, feet, etc. of an occupant or to a zone off a body of the occupant. The user may select the air temperature and/or a range of the air temperature. The user may also select a velocity of the air flow through the vent. These settings may be predetermined and used and/or adjusted during the automatic settings mode. These settings may also be predetermined, set and/or adjusted during the personalized settings mode.

At 454, the manual settings module 36 or the display module 40 displays one or more thermographic anthropomorphic figures and/or current settings (e.g., interior temperature settings, seat settings, steering wheel settings, air flow settings, positions of vanes and/or vents, etc.) based on previously collected data from the cameras 22. Operation 454 may be performed prior to operation 452. At 456, the manual settings module 36 stores the current settings in the memory 18.

At 458, the manual settings module 36 determines whether to repeat the setting process for the manual mode for same or different occupants or non-vehicle occupants. This may be based on a user input requesting a change to a setting for another occupant. If the setting process is to be repeated, operation 450 is performed; otherwise the method may end at 460.

The above-described operations of FIGS. 7-12 are meant to be illustrative examples; the operations may be performed sequentially, synchronously, simultaneously, continuously, during overlapping time periods or in a different order depending upon the application. Also, any of the operations may not be performed or skipped depending on the implementation and/or sequence of events.

The above-described methods allow a user/occupant to visually observe temperature changes of occupants based on changes in settings. This allows a user to maximize comfort. The user/occupant is able to increase heating/cooling in selected zones. This provides the user/occupant with accurate temperature control. The user/occupant and/or control system is able to visually observe where hot/cold spots exist and adjust settings accordingly to minimize and/or eliminate the hot/cold spots.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A heating, ventilation and air-conditioning system comprising:
a memory to store a plurality of settings, wherein the plurality of settings are for interior temperatures of a vehicle, a temperature of a steering wheel, and temperatures of seats within the vehicle; and
a control module to
collect data from one or more cameras, wherein the data corresponds to one or more captured images of an interior cabin of the vehicle,
based on the data, display a thermographic anthropomorphic figure on a display of the vehicle or a mobile device, wherein the thermographic anthropomorphic figure is a thermogram representative of temperatures of an occupant of the vehicle,
receive via a user interface a first input from a user to adjust one of the plurality of settings,
display user selectable zones at a same time over the thermographic anthropomorphic figure on the display,
receive, via the user interface, a second input from the user indicating selection of one of the user selectable zones, and
based on the first input and the second input from the user, adjust operation of a first controlled device to change at least one of the temperatures of the occupant in the selected one of the user selectable zones.

2. The heating, ventilation and air-conditioning system of claim 1, wherein:
the first controlled device includes a first motor of a vent or a second motor of a set of vanes of the vent; and
the control module is to, based on at least one of the the first input and the second input from the user, adjust a position of the vent via the first motor or a position of the vanes via the second motor.

3. The heating, ventilation and air-conditioning system of claim 1, wherein:
the first controlled device is an element in the steering wheel or in one of the seats, and
the control module is to, based on the first input or a third input from the user, adjust current or a signal to the first controlled device to change a temperature of the first controlled device.

4. The heating, ventilation and air-conditioning system of claim 1, wherein the control module is to:
permit iterative adjustment of the plurality of settings while displaying updated versions of the thermographic anthropomorphic figure, wherein each of the updated versions of the thermographic anthropomorphic figure represents updated changes in temperatures of the occupant due to a corresponding one of the adjustments of the plurality of settings; and adjusting operation of a corresponding one or more of a plurality of controlled devices based on the adjustments of the plurality of settings, wherein the plurality of controlled devices include the first controlled device.

5. The heating, ventilation and air-conditioning system of claim 1, wherein the control module is to:
ask questions of the user;
receive answers from the user as a plurality of user inputs, wherein the plurality of user inputs include the first input and the second input;
determine user preferences of the plurality of settings based on the plurality of user inputs; and
adjusting a plurality of controlled devices based on the user preferences, wherein the plurality of controlled devices include the first controlled device.

6. The heating, ventilation and air-conditioning system of claim 1, wherein:
the control module is to operate in an automatic settings mode, a personalized settings mode, and a manual settings mode; and
the control module is to
determine whether the vehicle is being used for public use or private use, wherein public use and private use are independent of whether multiple users operate the vehicle,
based on whether the vehicle is being used for public use or private use, determine whether to operate in one of the automatic settings mode, the personalized settings mode, and the manual settings mode,
while operating in the automatic settings mode, adjust operation of a plurality of control devices based on default values for the plurality of settings,
while operating in the personalized settings mode, adjust operation of the plurality of control devices based on personal preference values for the plurality of settings, and
while operating in the manual settings mode, adjust operation of the plurality of control devices based on inputs received from the user.

7. The heating, ventilation and air-conditioning system of claim 1, wherein the control module is to, while operating in a cabin comfort mode:
compare a first temperature of a first zone to a second temperature of a second zone;
based on a result of the comparison, determine whether to use a default setting or a user preference setting;
display the default setting or the user preference setting;
adjust a temperature of the first zone based on the default setting or the user preference setting; and
collect data from the one or more cameras indicative of the temperature of the first zone,
wherein the thermographic anthropomorphic figure is indicative of a temperature of a portion of the user in the first zone.

8. The heating, ventilation and air-conditioning system of claim 1, wherein:
the first controlled device is disposed in the steering wheel;
a second controlled device is disposed in the one of the seats; and
the control module is to, while operating in a cabin comfort mode:
adjust a temperature of the steering wheel and a temperature of the one of the seats in the vehicle via the first controlled device and the second controlled device;
display the plurality of settings on the display of the vehicle or the mobile device;
permit user adjustment of the plurality of settings; and
store updated values of the plurality of settings.

9. The heating, ventilation and air-conditioning system of claim 1, wherein:
the user interface includes the display; and
the user is the occupant.

10. The heating, ventilation and air-conditioning system of claim 1, wherein the user is the occupant or another occupant of the vehicle.

11. The heating, ventilation and air-conditioning system of claim 1, wherein the control module is to:
obtain sun loading values; and
adjust operation of the first controlled device and a second controlled device based on the first input and the second input from the user and the sun loading values, wherein the first controlled device is a first motor of a vent or a second motor of a set of vanes of the vent, and wherein the second controlled device is a blower.

12. A heating, ventilation and air-conditioning system comprising:
a control module to operate in an automatic settings mode, a personalized settings mode, and a manual settings mode, wherein the control module is to
determine whether a vehicle is being used for public use or private use, wherein public use and private use are independent of whether multiple users operate the vehicle, and
based on whether the vehicle is being used for public use or private use, determine whether to operate in one of the automatic settings mode, the personalized settings mode, and the manual settings mode;
an automatic settings module to, while operating in the automatic settings mode, adjust operation of a plurality of controlled devices based on default values for a plurality of settings to change temperatures of an occupant of the vehicle, wherein the plurality of controlled devices include a motor of a vent, a motor of a set of vanes for the vent, and a blower for passing air through the vent;
a personalized settings module to, while operating in the personalized settings mode, adjust operation of the plurality of controlled devices based on personal preference values for the plurality of settings; and
a manual settings module to, while operating in the manual settings mode, adjust operation of the plurality of controlled devices based on inputs received from a user.

13. The heating, ventilation and air-conditioning system of claim 12, wherein:
the control module is to
receive signals from a plurality of sensors, and
determine characteristics of the user based on the received inputs and the signals; and
the automatic settings module is to access from a memory the default values based on the characteristics of the user.

14. The heating, ventilation and air-conditioning system of claim 12, wherein the automatic settings module is to, while operating in a cabin comfort mode:
adjust a temperature of a steering wheel of the vehicle via a first controlled device disposed in the steering wheel and a temperature of a seat in the vehicle via a second controlled device disposed in the seat, wherein the plurality of controlled devices include the first controlled device and the second controlled device;
display the plurality of settings on a display of the vehicle or a mobile device;
display a thermographic anthropomorphic figure on the display of the vehicle or the mobile device, wherein the thermographic anthropomorphic figure is a thermogram representative of temperatures of the occupant of the vehicle;
permit user adjustment of the plurality of settings; and
store updated values of the plurality of settings.

15. The heating, ventilation and air-conditioning system of claim 12, wherein the automatic settings module is to, while operating in a cabin comfort mode:
compare a first temperature of a first zone to a second temperature of a second zone;
based on a result of the comparison, determine whether to use a default setting or a user preference setting;
display the default setting or the user preference setting;
adjust a temperature of the first zone based on the default setting or the user preference setting;
collect data from a camera indicative of the temperature of the first zone; and
display a thermographic anthropomorphic figure on the display of the vehicle or a mobile device, wherein the thermographic anthropomorphic figure is a thermogram representative of temperatures of the occupant of the vehicle.

16. The heating, ventilation and air-conditioning system of claim 12, wherein:
the control module is to
receive signals from a plurality of sensors, and
determine characteristics of the user based on the received inputs and the signals; and
the personalized settings module is to
identify the user based on at least one of the characteristics and an identifier of the user, and
based on the at least one of the characteristics and the identifier of the user, determine the personal preferences of the user for the plurality of settings.

17. The heating, ventilation and air-conditioning system of claim 12, wherein, while operating in the personalized settings mode, the personalized settings module is to:
collect data from one or more cameras, wherein the data corresponds to one or more captured images of an interior cabin of the vehicle,
based on the data, display a thermographic anthropomorphic figure on a display of the vehicle or a mobile device, wherein the thermographic anthropomorphic figure is a thermogram representative of temperatures of the occupant of the vehicle,
receive via a user interface an input from the user to adjust one of the plurality of settings, and
based on the input from the user, adjust operation of a first controlled device to change a temperature of the occupant, wherein the plurality of controlled devices includes the first controlled device.

18. The heating, ventilation and air-conditioning system of claim 12, wherein, while operating in a cabin comfort mode, the personalized settings module is to:
adjust a temperature of a steering wheel and a temperature of a seat in the vehicle;
display the plurality of settings on a display of the vehicle or a mobile device;
display a thermographic anthropomorphic figure on the display of the vehicle or the mobile device, wherein the thermographic anthropomorphic figure is a thermogram representative of temperatures of the occupant of the vehicle;
permit user adjustment of the plurality of settings; and
store updated values of the plurality of settings.

19. The heating, ventilation and air-conditioning system of claim 12, wherein, while operating in a cabin comfort mode, the personalized settings module is to:
compare a first temperature of a first zone to a second temperature of a second zone;
based on a result of the comparison, determine whether to use a default setting or a user preference setting;
display the default setting or user preference setting;
adjust a temperature of the first zone based on the default setting or the user preference setting;
collect data from a camera indicative of the temperature of the first zone; and
display a thermographic anthropomorphic figure on the display of the vehicle or a mobile device, wherein the thermographic anthropomorphic figure is a thermogram representative of temperatures of the occupant of the vehicle.

20. The heating, ventilation and air-conditioning system of claim 12, wherein, while in the manual settings mode, the manual settings module is to:
collect data from one or more cameras, wherein the data corresponds to one or more captured images of an interior cabin of the vehicle,
based on the data, display a thermographic anthropomorphic figure on a display of the vehicle or a mobile device, wherein the thermographic anthropomorphic figure is a thermogram representative of temperatures of the occupant of the vehicle,
receive via a user interface an input from the user to adjust one of the plurality of settings, and
based on the input from the user, adjust operation of a first controlled device to change a temperature of the occupant, wherein the plurality of controlled devices includes the first controlled device.

21. The heating, ventilation and air-conditioning system of claim 12, wherein the user is the occupant.

22. The heating, ventilation and air-conditioning system of claim 12, wherein:
public use refers to when the vehicle is rented to the public, shared by members of an organization, or is used to provide transportation services; and
private use refers to when the vehicle is privately owned and operated by a private owner.

23. The heating, ventilation and air-conditioning system of claim 12, wherein the control module, while the vehicle is being used for the public use, operates in the automatic settings mode and prevents operation in the personalized settings mode and the manual settings mode.

* * * * *